United States Patent [19]

Brown, Jr.

[11] Patent Number: 4,463,572
[45] Date of Patent: Aug. 7, 1984

[54] SOFT ICE CREAM MACHINE

[75] Inventor: E. Vernon Brown, Jr., Portland, Oreg.

[73] Assignee: Glacier Products, Inc., Portland, Oreg.

[21] Appl. No.: 443,021

[22] Filed: Nov. 19, 1982

[51] Int. Cl.³ .............................................. A23G 9/00
[52] U.S. Cl. ........................................ 62/135; 62/342; 366/144
[58] Field of Search ................... 62/135, 342; 73/301; 374/170; 366/144

[56] References Cited

U.S. PATENT DOCUMENTS

| | | | | |
|---|---|---|---|---|
| 1,475,313 | 11/1923 | Newhard | ........................... | 62/135 X |
| 1,630,294 | 5/1927 | Foote . | | |
| 1,874,718 | 8/1932 | Tyson | ..................................... | 62/135 |
| 2,022,440 | 11/1935 | Slough . | | |
| 2,458,940 | 1/1949 | Harless | .................................. | 62/342 |
| 2,930,203 | 3/1960 | Koch . | | |
| 3,153,342 | 10/1964 | Pierce et al. | ........................... | 73/301 |
| 3,279,205 | 10/1966 | Stoelting . | | |
| 3,517,524 | 6/1970 | Fiedler | .............................. | 62/135 X |
| 3,698,206 | 10/1972 | Werner | ................................. | 62/342 |
| 3,898,858 | 8/1975 | Erickson . | | |
| 4,133,208 | 1/1979 | Parlanti | ........................... | 374/170 X |

FOREIGN PATENT DOCUMENTS 35-8021 3/1960 Japan .
512785 9/1939 United Kingdom .................. 62/135

Primary Examiner—William E. Tapolcai
Attorney, Agent, or Firm—Eugene M. Eckelman

[57] ABSTRACT

The front wall of a freezing barrel supports a rod-like projection extending into the inner area of the freezing chamber. Such rod-like projection is hollow and encloses a temperature sensor to directly measure the temperature of the mix being frozen. The rod-like projection also provides partial pivotal support for a mixing blade in the freezing chamber. The machine includes a temperature readout on a front panel thereof with plus or minus readings and also includes a fill light on such panel designating when fill material is to be added. A dial is also provided for precise setting of the temperature of the freezing chamber by specific degrees.

2 Claims, 3 Drawing Figures

U.S. Patent  Aug. 7, 1984  4,463,572
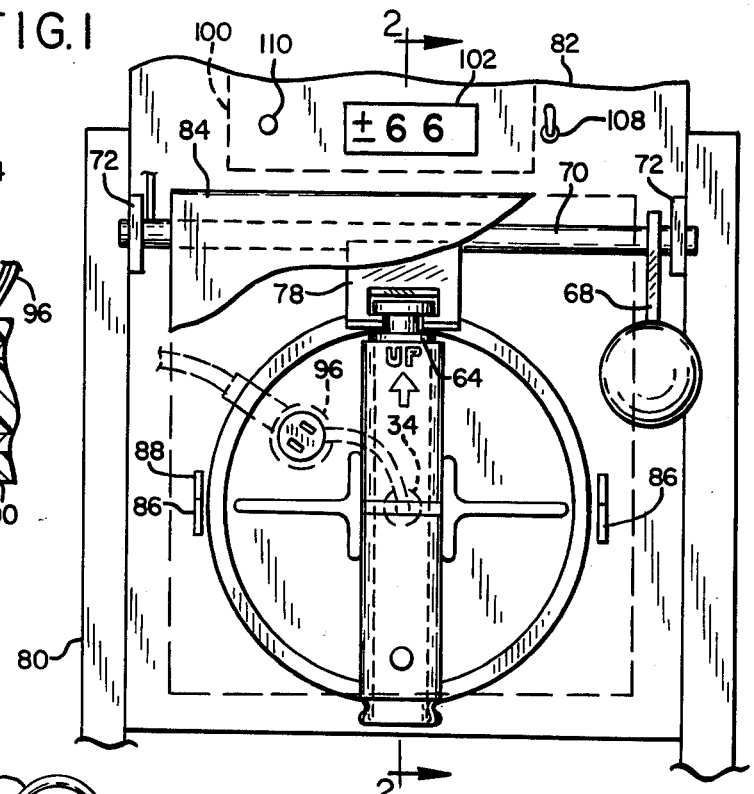
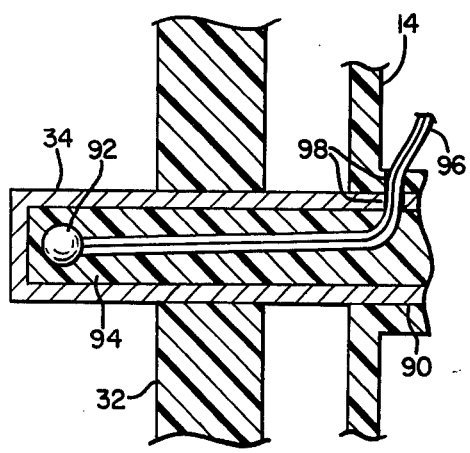
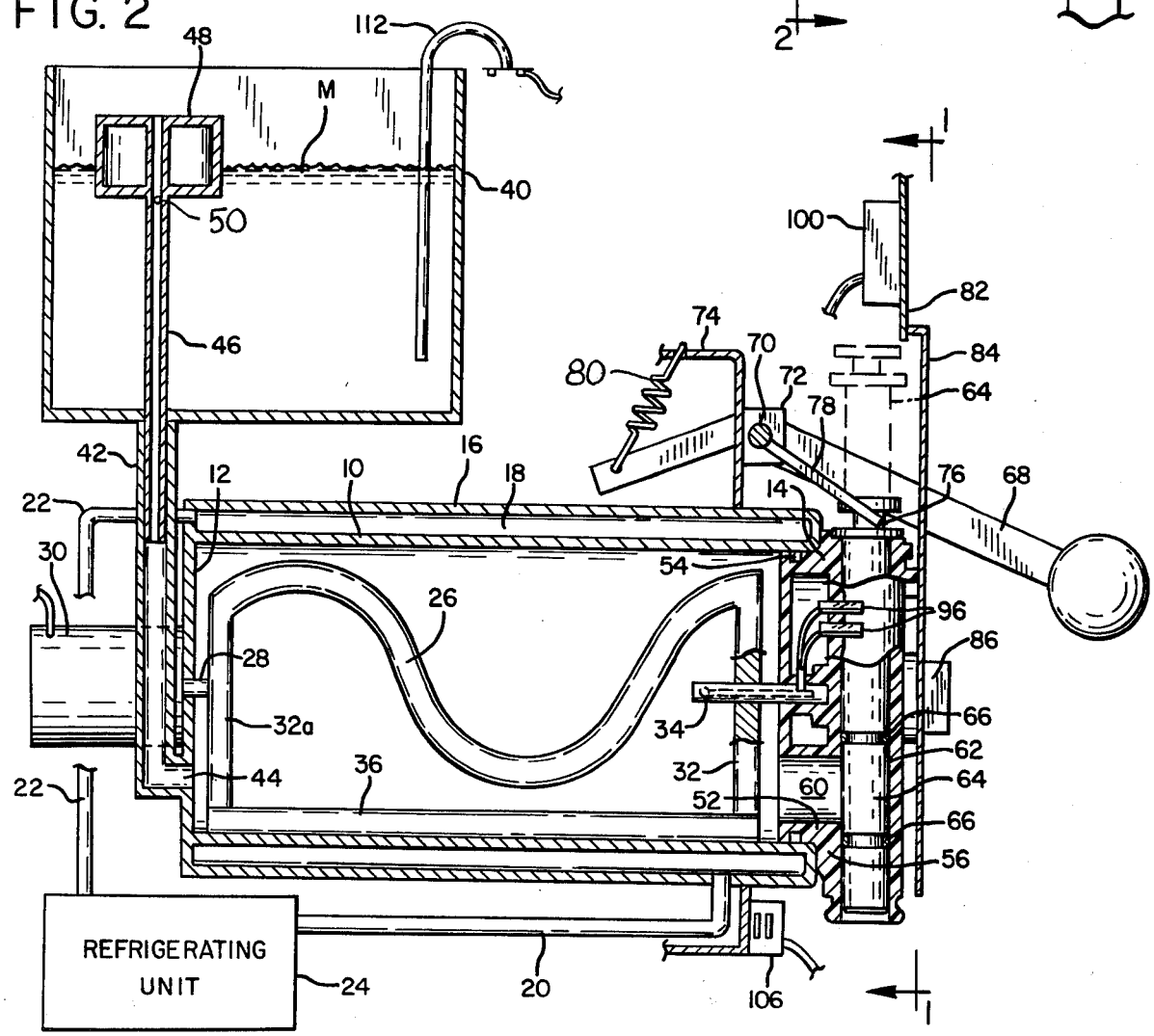

SOFT ICE CREAM MACHINE

BACKGROUND OF THE INVENTION

This invention relates to new and useful improvements in soft ice cream machines.

In U.S. Pat. No. 3,898,858, some of the problems involved in making soft ice cream are set forth. As stated, excess temperature fluctuations in the freezing and mixing barrel result in the formation of an inferior quality of ice cream. The structure of such prior patent utilized improved sensing means in that it sensed the temperature of the freezing barrel directly from the temperature of the ice cream rather than by sensing the temperature of a wall of the freezing barrel or other indirect means. Such improved device opened into the freezing and mixing chamber and had a sensing end that was flush with the inner surface of the front wall.

SUMMARY OF THE INVENTION

According to the present invention and forming a primary objective thereof, a soft ice cream machine is provided having a novel arrangement of sensing means which provides a further improved structure for sensing the temperature of the ice cream in the freezing and mixing chamber whereby a quality of ice cream consistency can be maintained which is even better than that accomplished in prior machines.

A further object of the invention is to provide novel temperature sensing means which for one thing projects a substantial distance into the freezing and mixing barrel whereby to be embedded in the ice cream for accurate sensing. Another object is to provide such projecting sensing means in an arrangement that forms a pivot for one end of a mixing blade.

Further objects of the invention are to provide temperature setting means including a hand dial with individual temperature degree settings so that a specific degree temperature operation of the freezing and mixing barrel can be maintained; to provide specific temperature degree readout means controlled by temperature sensing means for designating the specific degree of temperature of the ice cream; to provide sensing means and a signal for indicating when mix is to be added to a reservoir for the ice cream machine; to provide a novel front cover for the machine for incorporating the temperature sensing means and circuitry therefor; and to provide a novel outlet valve in said front cover for dispensing ice cream.

A further object is to provide a soft ice cream machine having a structural arrangement that makes it compact in size, inexpensive to manufacture, and efficient in operation.

For carrying out these objectives, the machine includes a freezing and mixing barrel having a rear inlet for admitting mix and an outlet valve at the front for dispensing ice cream. Temperature sensing means comprises a hollow rod-like projection leading from the rear or inwardly directed surface of the front cover into the freezing chamber so as to be embedded in the ice cream in the barrel for direct influence. The projection also serves as a pivot support for one end of the mixing blade in the barrel. The temperature sensing means is supported in a novel removable front cover which also houses a dispensing valve. A temperature set is provided for the freezing and mixing barrel comprising a hand dial for accomplishing individual temperature settings. The machine also has circuitry giving a specific temperature read-out including plus or minus in degrees of the mix temperature in the barrel. A fill light is also employed indicating that mix is to be added.

The invention will be better understood and additional objects and advantages will become apparent from the following description taken in connection with the accompanying drawings which illustrate a preferred form of the device.

BRIEF DESCRIPTION OF THE DRAWINGS

FIG. 1 is a fragmentary front elevational view of a soft ice cream machine embodying features of the present invention;

FIG. 2 is a vertical sectional view of the machine taken on the line 2—2 of FIG. 1; and FIG. 3 is an enlarged fragmentary sectional view of temperature sensing means embodied in the machine.

DETAILED DESCRIPTION OF A PREFERRED EMBODIMENT

With particular reference first to FIG. 2, the ice cream machine of the present invention contains a tubular freezing barrel or chamber 10 having a rear wall 12 and a removable front wall or cover 14. The freezing barrel has an outer wall 16 which forms a cooling chamber 18 associated with an inlet conduit 20 and an outlet conduit 22 of a refrigerating unit 24 of conventional construction.

The freezing barrel 10 has a longitudinally disposed mixing arm 26 of well-known construction secured at one end on a shaft 28 extending through the rear wall 12 of the chamber 10 and comprising the output shaft of a motor and gear reduction mechanism 30. The forward end of the mixing arm 26 has a transverse extension 32 journaled on a rearwardly extending projection 34 supported by the front wall 14. Secured on the end of extension 32 and a transverse extension 32a at the rearward end of the chamber is a scraper blade 36 the outer edge of which is adapted to scrape frozen ice cream from the inside surface of the barrel upon rotation of the mixing arm. The scraper blade 36 and the mixing arm 26 are of a shape or otherwise arranged in a well-known manner such that the ice cream is urged forward for dispensing.

The ice cream is formed from a prepared mix M in a reservoir 40 above the barrel 10. The reservoir may comprise a tank mounted on the barrel 10 in any suitable manner such as by a hollow tubular support 42 projecting integrally upwardly along the rear portion of the barrel. The bottom of the support 42 has a port 44 opening into the barrel 10. The upper end of the tubular support 42 opens into the bottom of the reservoir 40. An open ended hollow stem 46 in the reservoir is slidably engaged in the tubular support 42 and carries a float 48 at its upper end. The float 48 moves up and down with the ice cream mix M, with the lower end of the stem 46 slidably adjusting in the support 42. Stem 46 has an inlet opening 50 adjacent its upper end through which the ice cream mix enters the stem and flows down through the support for feeding into the barrel. The inlet opening 50 is a short distance below the mix level of the float and is of selected dimension such that the maximum rate of flow therethrough is equal to or slightly more than the freezing and mixing capacity of the freezing barrel. Since this opening is always at the same position with relation to the top surface of the mix and the head pressure in the inlet does not vary, the rate of flow of the mix into the freezing barrel is identical at all times.

The front of the barrel 16 is open and the wall 14 comprises a front cover therefor. This wall comprises a thickened structure consisting of a body portion 52 which snugly fits in the open end of the chamber and which has an O-ring seal 54 in the fitted portion. Body portion 52 has a peripheral flange 56 which abuts against the front edge of the chamber.

Front wall 14 has a bottom horizontal outlet opening 60 for the ice cream. This opening communicates with a vertical opening or bore 62 slidably receiving a plunger-type dispensing valve 64 which intersects the opening 60 and which has a pair of O-ring seals 66 spaced so as to close off the opening 60 in a lower position of the plunger but arranged to allow outflow of ice cream from opening 60 through the bottom of opening 62 in a raised position of the plunger, this latter position of the plunger being shown in phantom lines in FIG. 2. An operating lever 68 projects forwardly for convenient access to the operator and has a rear pivotal support on a cross shaft 70 having a journalled support 72 on a frame portion 74 which forms an integral part of the machine. The upper end of plunger 64 has a peripheral groove 76 engaged by a bifurcated lever 78 integral with the shaft 70. Lever 78 serves to move the plunger up and down with operation of the operating lever 68 and has spring return by means of a tension spring 80 secured between the frame of the machine and an angled end of lever 68.

The frame portion 74 supports an outer housing or jacket 82, such frame and housing being mostly broken away for clarity. The outer housing includes a lock plate 84 having suitable removable attachment to the freezer barrel 16 such as by notched tabs 86 on the barrel having removable association with vertical slots 88 in the lock plate 84.

With particular reference also to FIG. 3, the projection 34 that forms the pivot comprises a hollow rod-like structure. The inner end of this projection is fitted in a recess 90 of the front wall 14, such a fit comprising an integral connection such as an adhesive connection whereby to provide a solid pivot support for the one end of the mixing arm 26. This projection extends throughout most of its length into the freezing barrel and encloses a temperature sensor 92 such as a thermistor. The sensor 92 is located close to the free end of the projection 34 in order to accomplish effective sensing of the ice cream temperature with minimum influence from the front wall of the machine. Further yet, the temperature sensor 92 is enclosed within a heat conducting material 94 in the projection 34 whereby to provide an efficient, non-insulated association with the projection 34. Projection 34 also is formed from a heat conducting material such as stainless steel.

The sensor means, being directly embedded in the ice cream, accurately senses the temperature of the ice cream. Such sensor has circuit wires 96 extending through apertures 98 in the rod-like projection 34 and also in the front wall 14, the latter being hollow for receiving these wires interiorly thereof. The front wall preferably is constructed of an insulating plastic and its hollow structure also provides an insulation space for the front of the barrel 16. Circuit wires 96 lead to a control board 100 mounted on the rear side of housing 82. This control board includes circuitry which operates the refrigerating unit 24 in response to the temperature sensor 34. As stated, since the temperature sensor 34 is directly embedded in the ice cream, control of the refrigerating unit can be precise so as to produce a smooth consistency ice cream.

Control board 100 includes a readout 102 which projects through the front of the housing 82 so as to be visible to the operator, such readout including a plus or minus readout in addition to the temperature degree to add to the preciseness of the readout. The barrel temperature is thus readily visible to a precise plus or minus degree. Control means of the invention also include temperature setting means 106 connected to the control board 100 by suitable circuitry and having specific temperature setting dial whereby the operator can set the machine to a specific temperature, as opposed to previous devices that merely provide settings for warmer or cooler. The temperature setting means 106 can be mounted anyplace within the machine, preferably in an inconspicuous, tamper-proof position.

Control board 100 includes a fill light 110 such as a red lamp which projects through the front panel 82 and which is in circuit with a sensor 112 of a selected length projecting into reservoir 40. Sensor 112 is located such that it causes actuation of a signal to the lamp 110 when it is desired that ice cream mix be added to the reservoir. An on-off switch 108 is mounted on the front of the housing adjacent the control board 100.

According to the invention, a precise temperature sensing of the ice cream is accomplished and such temperature is displayed on the front of the machine for the most efficient ice cream manufacture under the control of an operator. A precise temperature setting can be accomplished by the setting means 106. The fill light 110 will insure against freeze-ups since its energization provides an alerting signal to the operator to add ice cream mix. The structure of the machine is simplified and inexpensive to manufacture and furthermore is extremely compact so as to take up minimum counter space.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A soft ice cream machine comprising
    a freezing barrel having front, rear and enclosing side walls with an interior surface defining a freezing and mixing chamber,
    an inlet adjacent the rear wall of said freezing barrel for admitting mix into said chamber,
    an outlet valve in the front wall of said freezing barrel for dispensing ice cream,
    mixing means in said barrel for mixing said ice cream and forcing it from said outlet valve,
    a cooling chamber associated with at least a portion of said freezing barrel,
    refrigerating means associated with said cooling chamber for cooling the freezing barrel,
    and temperature sensing means supported on said front wall controlling the operation of said refrigerating means to cause operation of the latter at a selected sensing temperature,
    said temperature sensing means comprising a hollow rod-like projection with inner and outer end portions and enclosing a sensor,
    said projection leading from its inner end portion from said front wall with its outer end portion extending into said freezing and mixing chamber whereby to be embedded in ice cream for direct influence of the ice cream on said sensor, said outer end portion of the rod-like projection of said temperature sensing means providing partial support for said mixing means.

2. A soft ice cream machine comprising a freezing barrel having front, rear and enclosing side walls with an interior surface defining a freezing and mixing chamber, an inlet adjacent the rear wall of said freezing barrel for admitting mix into said chamber, an outlet valve in the front wall of said freezing barrel for dispensing ice cream, at least one mixing blade in said barrel for mixing said ice cream and forcing it from said outlet valve, a cooling chamber associated with at least a portion of said freezing barrel, refrigerating means associated with said cooling chamber for cooling the freezing barrel, and temperature sensing means supported on said front wall controlling the operation of said refrigerating means to cause operation of the latter at a selected sensing temperature, said temperature sensing means comprising a hollow rod-like projection with inner and outer end portions and enclosing a sensor, said projection leading from its inner end portion from said front wall with its outer end portion extending into said freezing and mixing chamber whereby to be embedded in ice cream for direct influence of the ice cream on said sensor, said mixing blade having opposite end portions with one end portion thereof provided with horizontal axis pivot support on said rear wall of said freezing barrel and the other end portion thereof having pivot support on the rod-like projection of said temperature sensing means.

* * * * *